Figure 1:
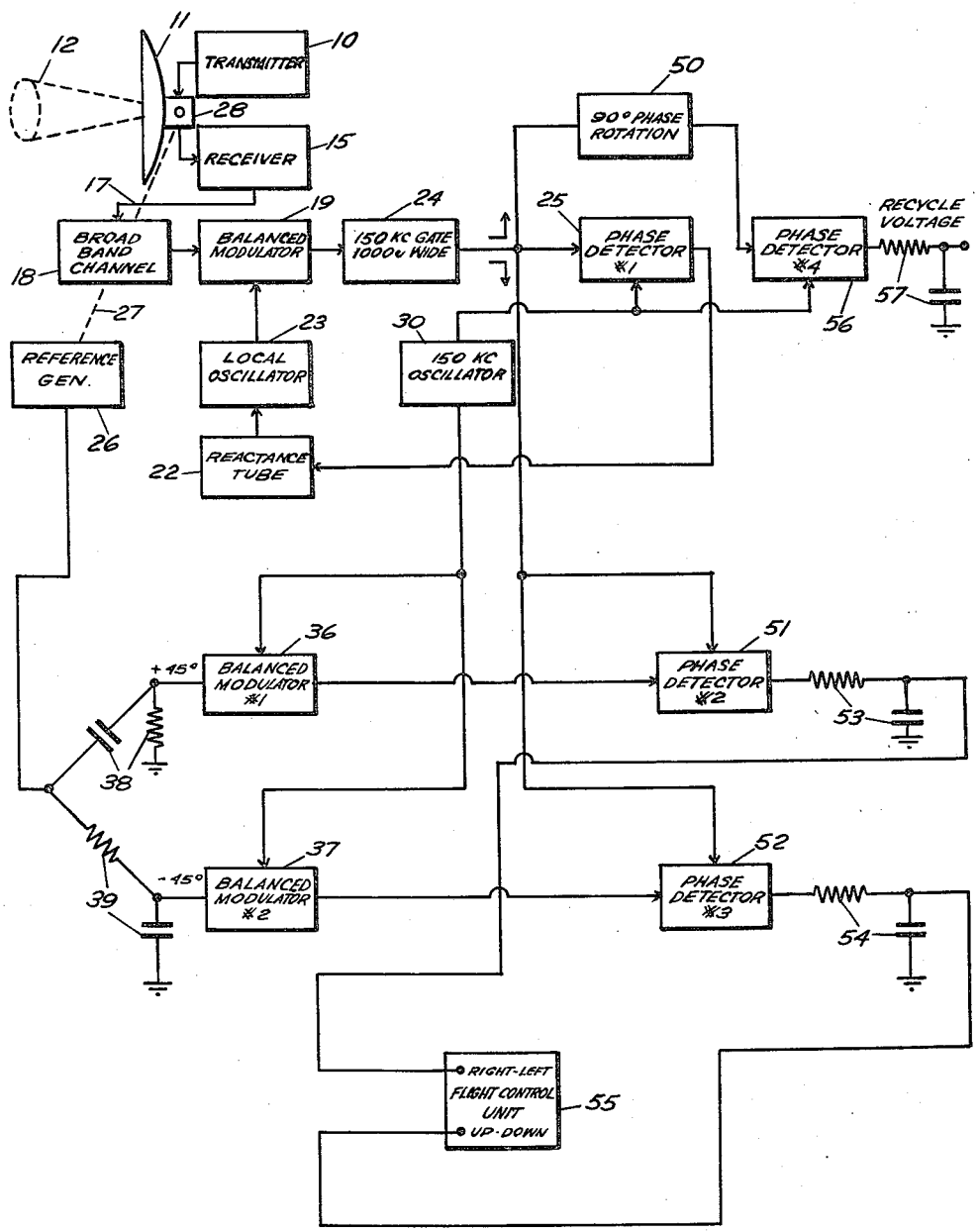

INVENTOR
MARTIN R. RICHMOND
By Elmer J. Gorn
ATTORNEY

INVENTOR
MARTIN R. RICHMOND

United States Patent Office 3,082,416
Patented Mar. 19, 1963

3,082,416
PRECISION DETECTION OF RADAR SIGNALS
Martin R. Richmond, Nashua, N.H., assignor to Raytheon Company, Lexington, Mass., a corporation of Delaware
Filed Aug. 10, 1954, Ser. No. 448,824
7 Claims. (Cl. 343—7.4)

This invention relates to systems for the detection of distant objects and particularly CW radar systems for the reception of reflected signal energy modulated to fall within a designated IF band, and for the utilization of such signal energy to control the flight of a guided missile or to accomplish other control functions.

The invention is herein illustrated as applied to a radar system having a conically scanning antenna arrangement together with speed gating means responsive to a Doppler frequency signal indicative of the relative speed of the reflecting target.

In systems of the character indicated the signal-to-noise ratio is a function of the width of the intermediate frequency band, but unfortunately the IF band width is dictated by the width of the conical scanning frequency itself; and since the conical scanning pattern must be kept reasonably wide there is necessarily an objectionable noise factor inherent in the energy admitted to the IF gate. Added to this undesirable noise factor is the uncertainty produced by the intrusion of additional craft or other objects into the conically scanned path. Such additional objects create multiple Doppler signal effects at the receiver with correspondingly confused information passing through the IF gate.

The present invention is characterized by a method of signal reception and analysis wherein there is obtained a first signal consisting of an extremely narrow central segment straddling the middle point of the IF band and having phase coherency with the Doppler signal, and two other signals consisting of side segments extending toward the respective edges of the IF band. The signal content of these two side segments are separately analyzed and multiplied by essentially a modulator process with the central signal, so that the effect of the multiplied signals upon the missile's control system (or other control mechanisms, where the invention is applied to purposes other than missile guidance) is to cause the control system to vary in accordance with the relative strength and location of each received signal component within the IF band. By this method it becomes much easier to discriminate against multiple Doppler-induced signals and thus concentrate upon a single target, and at the same time free the received signal of its noise accompaniment.

Figure 2:
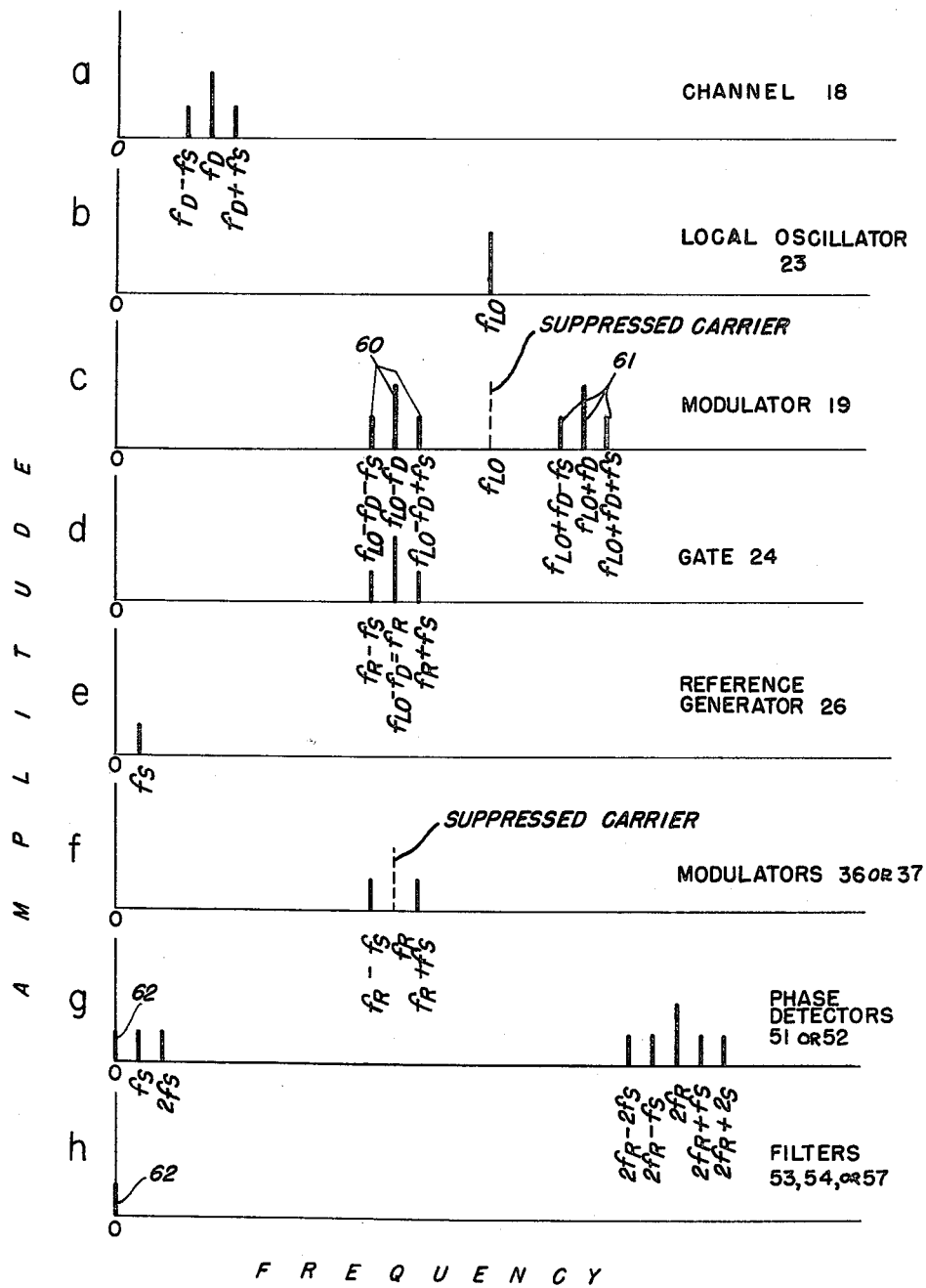

The invention is also characterized by the arrangement of electronic components in a sequence and apposition well adapted to pursuit of the method of operation above outlined. The invention may be best described with the help of the drawing in which:

FIG. 1 shows a partial block diagram and partial schematic diagram of the invention as applied to a radar system of the continuous wave type; and FIG. 2 illustrates the frequency spectrum of the signals appearing at specified points of the system shown in FIG. 1.

FIG. 1 illustrates the invention as applied to a radar system of the continuous wave type. Such a system commonly includes a conically scanning antenna reflector 11 emitting a directed beam 12 of radiant energy originating at transmitter 10. A receiver 15 employing the same antenna reflector receives that portion of the signal energy which is reflected back by an intercepted target, not shown. The receiver 15 is appropriately tuned to receive energy of a frequency corresponding to the frequency transmitted, as modulated by the Doppler effect at the point of reflection by the intercepted target. A certain amount of transmitted energy continuously finds its way into the receiver 15 so that, by operation of the well-known phenomenon of beating instantaneously transmitted and received energy together, the receiver functions to furnish a difference signal representing the "Doppler shift," or relative speed of the "sighted" target with respect to the craft carrying the radar equipment. This difference signal is supplied by the receiver 15 to the broad-band channel 18 over a suitable connecting line 17. FIG. 2a shows the frequency spectrum of the signal appearing at the output of channel 18, said spectrum indicating the presence of a signal at the Doppler frequency $f_D$ having two side-bands $(f_D + f_S)$ and $(f_D - f_S)$ differing from the Doppler frequency by an amount equal to the conical scanning frequency $f_S$.

From circuit 18 the energy passes to the balanced modulator or mixer 19 where it modulates the output of local oscillator 23 whose frequency $f_{LO}$ is automatically controlled by the reactance tube circuit 22. FIG. 2b illustrates the frequency spectrum of the output of local oscillator 23 and FIG. 2c illustrates the frequency spectrum for the output of balanced modulator 19 wherein the center frequency of sidebands 60 and 61 differs from local oscillator frequency $f_{LO}$ by the Doppler frequency $f_D$. Side-bands 60 and 61 are themselves modulated by the scanning frequency $f_S$. The output from modulator 19 enters the IF component 24 constituting frequency gating or filtering means permitting passage to a phase detector 25 of only that portion of the received energy which has a frequency extremely close to the center frequency (herein assumed to be 150 kc.) of the modulation envelope. The frequency spectrum of the output of component 24 is shown in FIG. 2d wherein upper sideband 61 has been eliminated. For convenience, the center reference frequency $f_{LO} - f_D$ has been designated in FIGS. 2e, 2f and 2h as $f_R$. This phase detector 25 receives its reference frequency from a second oscillator 30 adjusted to send energy to the phase detector 25 at the frequency (as assumed, 150 kc.) corresponding to the center frequency of the IF band 24, and delivers its D.C. output through the reactance tube-cathode follower combination 22 leading back to the first-described oscillator 23. Thus the output of gate 24 is controlled to lock in phase with reference oscillator 30 by reason of the delivery of said output to the control circuit of local oscillator 23, whose frequency is in this manner maintained at the selected reference value which is equal to the sum of the Doppler frequency and the frequency of oscillator 30 which, in this case, is at 150 kc.; that is to say, the frequency of the energy supplied by the local oscillator 23 is locked in phase coherency with the signal derived from the modulation of the incoming carrier wave.

The IF band gate adjustment, as above noted, is restricted in width to pass only those signals falling within an extremely small frequency range embracing not more than 500 cycles on either side of the 150 kc. assumed center frequency. To supplement this signal reception the invention includes the step of detecting additional signal information picked up by the conically scanning antenna, representing the maneuvering of the located target or other object embraced by the conical sweep of the antenna, these additional signals being of a frequency on one side or the other of the very narrow center band constituting the IF gate and differing from the center frequency by the frequency of the conical scan. In the illustrated embodiment such a step includes the provision of two additional reference carriers so adjusted as to be synchronous with the said two information side bands at the frequency of the conical scan. These two additional side carriers may be produced by modulating the output of the second reference oscillator 30 with the output of a reference synchronous generator 26 rotated by driving means 27, 28 synchronized with the rotation of antenna reflector 11. The output of reference generator 26 is shown in FIG. 2e and has a frequency equal to the scan frequency $f_S$.

As shown the modulation just referred to is brought about by providing two balanced modulators 36 and 37 and phase shifting the synchronous generator inputs thereto by the means shown at 38 and 39, so that one input has a 45° phase lead over the generated signal, and the other has a 45° phase lag. The frequency spectrum of the output of balanced modulators 36 and 37 is shown in FIG. 2f. It is well to remember at this point that while the frequency spectra of the outputs of 36 and 37 are similar, the outputs actually differ in phase by 90° so that the signals are orthogonally related. The output of the two balanced modulators are multiplied by essentially a modulation process with the output of the 150 kc. gate 24. This modulation operation is accomplished in two phase detectors 51 and 52, and results in a signal the frequency spectrum of which is shown in FIG. 2g. This signal contains a D.-C. component 62 and a number of A.-C. components made up of combinations of the center reference frequency $f_R$ (for this example, substantially equal to 150 kc.) and the scanning frequency $f_S$. The A.-C. components are substantially filtered by filters 53 and 54. The D.C. output of one of said detectors is proportional to the up-down signal supplied to control unit 55, while the D.C. output from the other phase detector is proportional to the right-left signal supplied to said control unit. FIG. 2h shows the D.-C. component 62 remaining after the filtering process in the filters 53 and 54. These two orthogonally related signals complement each other by copulatively energizing servo elements of conventional design for accomplishing the desired missile guiding or other function. The band widths represented by these two complementary signal-producing circuits are controlled by the RC time constant elements associated with the respective phase detectors, as indicated at 53 and 54. Since the mixing signal in all cases of phase detection is of high value as compared to the strength of any signal or noise coming out of the 150 kc. gate, the overall effect is in the nature of signal translation rather than signal detection; hence the band narrowing result produced by these low frequency RC time constants 53 and 54 is equivalent to narrowing the band of the 150 kc. gate.

A separate phase detector 56 is provided to accomplish the recycling function. The recycle voltage is used to actuate automatic search and acquisition circuits. If a target signal appears, a voltage exists at the output of frequency gate 24. This voltage is applied through a 90° phase shifter to phase detector 56 and filter 57 and provides a D.-C. output which is used as a holding voltage to prevent the operation of the radar search and acquisition circuits. If no voltage appears at gate 24, no recycle voltage is present and the radar search and acquisition circuits are caused thereby to operate automatically until a target is picked up. If the 150 kc. signal supplied to this phase detector 56 is shifted 90°, as indicated at 50, the D.C. output of this phase detector will be proportional to the signal strength of the signal passing through the gate. The clarity of the signal may be improved by incorporation of conventional filtering circuits as indicated at 57 if such clarification is considered desirable. The output of filter 57 is a D.-C. voltage whose frequency spectrum will look substantially as shown in FIG. 2h.

With the signal control method and apparatus above described the signal input to the control unit is maintained at a degree of accuracy sufficient to assure precise tracking of a sighted target under all maneuvering conditions of the target including maximum acceleration conditions. The arrangement disclosed is also capable of maintaining a high signal-to-noise ratio, as well as effective discrimination against interfering Doppler signals of the same amplitude as the signal from the target being tracked, the results in this respect being far superior to those heretofore attainable under the handicap of the relatively wide sweep area embraced in conical scanning operations. In fact the selectivity of the signal control arrangement described and illustrated is of such high efficiency that it will resist capture of the phase detector by an interfering signal under all normal conditions. To accomplish such a capture the interfering signal would have to be of an exceptionally high magnitude with respect to the signal previously in control. The predominance of the interfering signal would probably have to exceed that of the signal previously in control by at least 12 decibels per octave in order to take over, and with such a degree of predominance the relative importance of the interfering craft producing such a predominant signal would probably render it desirable to have the tracking operation transferred to the control of such a dominating new signal.

While the invention has been described as embodied in a particular arrangement of circuit components, as illustrated, it is to be understood that many other combinations and arrangements of parts may be designed for operation in accordance with the principles herein disclosed. Such modifications, in so far as they are within the scope of the appended claims, are to be considered as embraced herein.

What is claimed is:

1. A target tracking system comprising an antenna; means for providing a transmitting signal to said antenna; means for conically scanning said antenna at a selected scanning frequency; means for receiving from said antenna echo signals reflected from a target; means responsive to said reflected echo signals for providing a Doppler input signal; a reference oscillator having a selected frequency; means responsive to said Doppler input signal and to said reference oscillator signal for producing a narrow band signal having a center frequency equal to the frequency of said reference oscillator signal and having phase coherency with said Doppler input signal; means for generating a reference signal at said scanning frequency; means responsive to said scanning frequency reference signal and to said narrow band signal for producing output signals proportional to the position of said target.

2. A target tracking system comprising an antenna; means for providing a transmitting signal to said antenna; means for conically scanning said antenna at a selected scanning frequency; means for receiving from said antenna echo signals reflected from a target; means responsive to said reflected echo signals for providing a Doppler input signal; a reference oscillator having a selected frequency; means responsive to said Doppler input signal and to said reference oscillator signal for producing a narrow band signal having a center frequency equal to the frequency of said reference oscillator signal and having phase coherency with said Doppler input signal; means for generating a pair of reference signals at said scanning frequency; means responsive to said scanning frequency reference signals and to said narrow band signal for producing a pair of output signals proportional to the elevation and azimuth position of said target.

3. A target tracking system comprising an antenna; means for providing a transmitting signal to said antenna; means for conically scanning said antenna at a selected scanning frequency; means for receiving from said antenna echo signals reflected from a target; means responsive to said reflected echo signals for providing a Doppler input signal; a reference oscillator having a selected frequency; means responsive to said Doppler input signal and to said reference oscillator signal for producing a narrow band signal having a center frequency equal to the frequency of the reference oscillator signal and having phase coherency with said Doppler input signal; means for generating a reference signal at said scanning frequency;

means responsive to said scanning frequency reference signal and to said narrow band signal for producing output signals proportional to the position of said target; means responsive to said narrow band signal for providing a holding voltage in the presence of said narrow band signal.

4. A target tracking system comprising an antenna; means for providing a transmitting signal to said antenna; means for conically scanning said antenna at a selected scanning frequency; means for receiving from said antenna echo signals reflected from a target; means responsive to said reflected echo signals for providing a Doppler input signal; a reference oscillator for providing a reference signal having a fixed frequency; phase locking means responsive to said Doppler input signal and responsive to said fixed frequency reference signal for producing a narrow band signal having a center frequency equal to said fixed reference frequency and having phase coherency with said Doppler input signal, said phase locking means including a local oscillator for producing a variable frequency signal; a balanced modulator responsive to said Doppler input signal and to said local oscillator signal for producing sideband signals; filter means responsive to said sideband signals for producing said narrow band signal; means responsive to said narrow band signal and to said fixed frequency reference signal for producing a frequency control signal for said variable local oscillator; means for generating a reference signal at said scanning frequency; means responsive to said scanning frequency reference signal and to said narrow band signal for producing output signals proportional to the position of said target.

5. A target tracking system comprising an antenna; means for providing a transmitting signal to said antenna; means for conically scanning said antenna at a selected scanning frequency; means for receiving from said antenna echo signals reflected from a target; means responsive to said reflected echo signals for providing a Doppler input signal; a reference oscillator for providing a reference signal having a fixed frequency; phase locking means responsive to said Doppler input signal and responsive to said fixed frequency reference signal for producing a narrow band signal having a center frequency equal to said fixed reference frequency and having phase coherency with said Doppler input signal, said phase locking means including a local oscillator for producing a variable frequency signal; a balanced modulator responsive to said Doppler input signal and to said local oscillator signal for producing sideband signals; filter means responsive to said sideband signals for producing said narrow band signal; means responsive to said narrow band signal and to said fixed frequency reference signal for producing a frequency control signal; a reactance tube responsive to said frequency control signal for controlling the frequency of said variable local oscillator; means for generating a pair of orthogonal reference signals at said scanning frequency; means responsive to said orthogonal scanning frequency reference signals and to narrow band signal for producing a pair of output signals proportional to the elevation and azimuth position of said target.

6. A target tracking system comprising an antenna; means for providing a transmitting signal to said antenna; means for conically scanning said antenna at a selected scanning frequency; means for receiving from said antenna echo signals reflected from a target; means responsive to said reflected echo signals for providing a Doppler input signal; a reference oscillator for providing a reference signal having a fixed frequency; phase locking means responsive to said Doppler input signal and to said fixed frequency reference signal for producing a narrow band signal having a center frequency equal to said fixed reference frequency and having phase coherency with said Doppler input signal, said phase locking means including a local oscillator for producing a variable frequency signal; a balanced modulator responsive to said Doppler input signal and to said local oscillator signal for producing sideband signals; filter means responsive to said sideband signals for producing said narrow band signal; means responsive to said narrow band signal and to said fixed frequency reference signal for producing a frequency control signal for said variable local oscillator; means for generating a reference signal having a frequency equal to said scanning frequency; phase shift means for providing a pair of orthogonal reference signals at said scanning frequency, means responsive to said orthogonal signals and to said narrow band signal for producing a pair of orthogonal control signals proportional to the elevation and azimuth positions of said target relative to said target tracking means.

7. A target tracking system comprising an antenna; means for providing a transmitting signal to said antenna; means for conically scanning said antenna at a selected scanning frequency; means for receiving from said antenna echo signals reflected from a target; means responsive to said reflected echo signals for providing a Doppler input signal; a reference oscillator for providing a reference signal having a fixed frequency; phase locking means responsive to said Doppler input signal and to said fixed frequency reference signal for producing a narrow band signal having a center frequency equal to said fixed reference frequency and having phase coherency with said Doppler input signal; means for generating a reference signal having a frequency equal to said scanning frequency; phase shift means for providing a pair of orthogonal reference signals at said scanning frequency; balanced modulator means responsive to said orthogonal signals and to said fixed frequency reference signal for providing a pair of suppressed carrier modulated signals; phase detection means responsive to said suppressed carrier modulated signals and to said narrow band signal for producing a pair of orthogonal control signals proportional to the elevation and azimuth position of said target relative to said target tracking means.

UNITED STATES PATENTS

References Cited in the file of this patent

| | | |
|---|---|---|
| 2,581,438 | Palmer | Jan. 8, 1952 |
| 2,644,138 | Bond | June 30, 1953 |